2

3,630,941
INFRARED FLUORESCING SYSTEMS
William Russell Bergmark, Buffalo, N.Y., assignor to American Cyanamid Company, Stamford, Conn.
No Drawing. Filed Sept. 3, 1968, Ser. No. 807,468
Int. Cl. C09k 3/00
U.S. Cl. 252—186      7 Claims

ABSTRACT OF THE DISCLOSURE

An infrared fluorescent solution comprising 16,17-dialkoxyviolanthrones in a solvent, and a method for obtaining infrared emission by radiant or chemical excitation of the fluorescent solution.

---

This invention relates to infrared fluorescing systems. More particularly, it relates to the use of solutions of 16,17-dialkoxyviolanthrones as infrared-emitting systems. Still more particularly, it relates to infrared-emitting chemiluminescent systems containing 16,17-dialkoxyviolanthrones.

The fluorescence of numerous inorganic and organic materials to provide emission visible to the human eye when such materials are stimulated by exciting radiation or chemical energy is well known. Such fluorescence is generally at a wavelength of from about 350 to just below the visible threshold of around 700 nanometers (i.e., millimicrons) of the spectrum. Such materials have been well known as useful in lighting, display screens, X-ray technology, and the like visible devices.

There is a developing need for materials which, when excited by ultraviolet or visible light or by other energy means, fluoresce in the infrared region of the spectrum, i.e., fluoresce at a wavelength of 700 nanometers or longer. Radiation at wavelengths of 700 nanometers or longer is substantially invisible to the human eye, but can be detected by suitable instruments. One of the potential uses for infrared fluorescers is in marking systems. For example, invisible marks made with infrared fluorescers on articles or materials can activate mechanisms via infrared detecting instruments.

It is therefore an object of this invention to provide compositions which fluoresce in the infrared region of the spectrum when excited by ultraviolet or visible light, i.e., by radiation of wavelengths below 700 nanometers, or by other means.

Another object is to provide chemiluminescence in the infrared region of the spectrum.

These and other objects of my invention will become apparent as the description thereof proceeds.

It has now been discovered that solutions of 16,17-dialkoxyviolanthrones of Formula I,

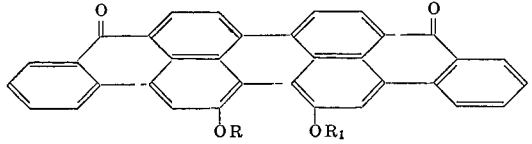

where R and $R_1$ are alkyl groups of 1 to 18 carbon atoms, fluoresce in the infrared region of the spectrum (i.e., at wavelengths of 700 nanometers are longer) when such solutions are excited by radiation of wavelengths below 700 nanometers. Furthermore, it has been discovered that the compounds of Formula I may serve as infrared fluorescent components of certain chemiluminescent systems.

The 16,17-dialkoxyviolanthrones of Formula I are well known as a class. The dimethoxy compound is a well-known dye, Vat Jade Green or C.I. Vat Green 1 (C.I. 59825). Other known members of the class are 16,17-diethoxy-, 16,17-diisopropoxy- and 16-ethoxy-17-methoxyviolanthrones. The class has also been called 16,17-dialkoxydibenzanthrones.

The compounds of Formula I can be obtained by alkylation of 16,17-dihydroxyviolanthrone according to published procedures, such as that described in U.S. Pat. 2,781,362.

The 16,17-dialkoxyviolanthrones of this invention fluoresce in the infrared when they are in solution, but not when they are in the solid state. For example, when dyed on cotton, the compounds do not fluoresce in the infrared, but when dyed on polyester fiber (such as Dacron), they do. On cotton the compounds are in the solid state, but on Dacron they are in solution.

Certain derivatives of 16,17-dihydroxyviolanthrone fluoresce in the visible region of the spectrum. Ethylenebisethers and 16,17-diacetoxyviolanthrone fluoresce in the visible region. (Formation of the latter compound is a test for dihydroxyviolanthrone.)

When the compounds of Formula I are dissolved in a solvent and the solution is irradiated at wavelengths below 700 nanometers, particularly by radiation below 400 nanometers (ultraviolet radiation), fluorescence of the solution in the infrared region of the spectrum, i.e., at wavelengths above 700 nanometers, can be detected by instrument. The fluorescence is not visible to the human eye. For maximum intensity of fluorescence, the 16,17-dialkoxyviolanthrones must be of very high purity.

An inert solvent in which the compounds of Formula I are soluble can be used in the infrared fluorescing systems of this invention. The solvents include liquids, such as dimethylformamide, o-dichlorobenzene, dimethyl phthalate, triethyl phosphate, etc., and solids, such as polyester polymers, including polyester fibers (Dacron, etc.), poly(vinyl chloride), cellulose esters, such as cellulose acetate-butyrate, poly(methyl methacrylate), etc.

As previously indicated, the fluorescers of this invention may also be used in a chemiluminescent system. Various chemiluminescent systems have been described in the prior art. There has been much discussion, considerable experimentation and voluminous literature on chemiluminescence. [See K. D. Gunderman, Angew. Chem. Intern. Ed. Engl. 4, 566 (1965); E. J. Bowen, Pure and Applied Chem. 9, 473 (1964); F. McCapra, Quart. Revs. 20, 485 (1966).]. A particularly good chemiluminescence system is disclosed in Netherlands patent application 66,12653 (American Cyanamid). The system is based on the use of organic peroxyoxalates and a fluorescer. Simple oxalates are converted to the peroxyoxalates by hydrogen peroxide. Especially suitable aryl oxalic esters contain negative substituents such as nitro, halo or cyano groups.

Other peroxyoxalate systems are described in United States Pats. Nos. 3,325,417; 3,329,621; 3,352,791; 3,366,572; and in the following copending commonly assigned applications: Ser. No. 428,828, now U.S. Pat. No. 3,442,813, filed Jan. 28, 1965; Ser. No. 442,818, now U.S. Pat. No. 3,425,949, filed Mar. 25, 1965; Ser. No. 485,920, now U.S. Pat. No. 3,399,137, filed Sept. 8, 1965; Ser. No. 520,044, now U.S. Pat. No. 3,400,080, filed Jan. 12, 1966; Ser. No. 520,052, now U.S. Pat. No. 3,442,815, filed Jan. 12, 1966; Ser. No. 547,761, filed May 5, 1966, refiled as Ser. No. 886,395, Dec. 18, 1969; Ser. No. 547,782, filed May 5, 1966, refiled as Ser. No. 844,567, July 24, 1969; Ser. No. 619,140, filed Feb. 28, 1967, now pending.

The compounds of this invention can serve as fluorescers in the above described oxalate-peroxide chemiluminescent systems. The emitted light is in the infrared portion of the spectrum. The compounds of this invention offer a further advantage for use in the chemiluminescent system in that they have a high degree of stability in the presence of oxalate and peroxide.

The fluorescers of this invention are not, however, confined to any particular chemiluminescent system, but are useful with any system providing sufficient transferable excitation energy for the fluorescers.

Moreover, it will be apparent that the various violanthrone derivatives of the invention may be used singly or together where advantageous, and in combination with other known fluorescers which do not defeat the purpose of the invention.

The following specific examples are set forth to illustrate the invention and are not intended to be limitative.

EXAMPLE 1

This example shows preparation of 16,17-dimethoxyviolanthrone for use as an infrared fluorescer. Technical Vat Jade Green press cake was dried in a Soxhlet extractor using benzene as the solvent and a trap to separate the condensed water from the benzene. The dried Vat Jade Green was fractionally extracted with reagent grade pyridine for about a 15-hour period. The pyridine extract was cooled and filtered. The crystalline precipitate was washed sequentially with chloroform, acetone and hexane and dried in vacuo. 16,17-dimethoxyviolanthrone has an absorption maximum ($\lambda$ max.) at 658–660 nanometers in dimethyl phthalate.

EXAMPLE 2

This example shows preparation of 16,17-dihexyloxyviolanthrone for use as an infrared fluorescer. n-Hexylbromide, 70 g. was slowly added to a solution of 40 g. 16,17-dihydroxyviolanthrone and 80 g. potassium carbonate in 200 ml. trichlorobenzene while the mixture was heated at the reflux temperature. After a further heating period of about 12 hours, the solvent was removed by steam distillation. The residual precipitate was separated by filtration and extracted in a Soxhlet extractor with ethyl acetate. The crystals from the extract were purified by chromatography on a column of alumina using ethyl acetate as the solvent. The pure product melted at 242–243° C.

EXAMPLE 3

This example shows radiation stimulation of an infrared fluorescer of the invention in liquid solution.

The infrared fluorescent emission spectrum of 16,17-dimethoxyviolanthrone (product of Example 1) was measured on an Aminco-Bowman spectrophotometer-fluorometer, Model 4–3202, with the following attachments: A Dry Ice cooled S–1 photomultiplier; a 600 groove per millimeter, 750 nanometers blaze grating; and a front end excitation-emission assembly. The emission spectrum was measured between 600 and 1,200 nanometers using a solution of the compound in dimethylformamide at room temperature. Excitation was provided by the 579 nanometer double emission line of mercury. A $10^{-4}$ molar Rhodamine B solution in ethanol was used as a quantum yield standard. Correction was provided for typical spectral response characteristics of the S–1 tube and the monochromator.

The following results were obtained:

Emission maximum=743 nanometers.
Fluorescent quantum yield=41%.

EXAMPLE 4

Using the same conditions as in Example 3, except using dimethyl phthalate as the solvent (1.10 mg. of compound per 100 ml. of solvent), the emission maximum was found to lie at 720 nanometers and the fluorescent quantum yield was about 66%.

EXAMPLE 5

The general procedure of Example 3 was followed using a solution of 16,17-dihexyloxyviolanthrone (product of Example 2) in dimethyl phthalate (3.23 mg. per 100 ml.) with excitation provided by the 546 nm. emission line of mercury.

The emission maximum was at 720 nm. and the fluorescent quantum yield was about 43%.

EXAMPLE 6

This example shows the use of a fluorescer of the invention in solid solution.

Dacron fabric dyed by a standard disperse dyeing procedure with 16,17-dimethoxyviolanthrone (Vat Jade Green) was examined for infrared fluorescence. Using the instrument described in Example 3 with suitable modification to permit measurement of a swatch of cloth, the dyed cloth showed very strong emission with a maximum at 725 nm.

EXAMPLE 7

In this example, a fluorescer of the invention is used in a chemiluminescent system.

A 0.25 molar solution (1.0 ml.) of hydrogen peroxide in triethyl phosphate was added to a solution of 0.045 g. bis-(2,4-dinitrophenyl) oxalate and 0.00253 g. 16,17-dimethoxyviolanthrone in about 10 ml. triethyl phosphate. Emission in the infrared was detected by an infrared detecting instrument. The emission continued for over one hour.

EXAMPLE 8

The same chemiluminescent system as in Example 7 was used except that 16,17-dihexyloxyviolanthrone was used as the fluorescer instead of 16,17-dimethoxyviolanthrone. This also showed strong infrared luminescence.

EXAMPLE 9

This example illustrates a chemiluminescent infrared system.

To a solution of 0.0066 g. 16,17-dihexyloxyviolanthrone, 0.089 g. bis(2,4,6-trichlorophenyl) oxalate and 0.0016 g. sodium salicylate in 9 ml. o-dichlorobenzene there was added a solution of 0.0144 g. hydrogen peroxide in 1 ml. t-butyl alcohol. The resulting chemiluminescence was invisible to the eye but easily detected by an infrared detecting instrument.

EXAMPLE 10

A saturated solution of 16,17-dimethoxyviolanthrone in tetrahydrofuran (THF) was added to a saturated solution of plasticized poly(vinyl chloride) (PVC) in THF, and the resulting strongly colored solution was evaporated in vacuo until a viscous solution was obtained. A film was cast by dipping a microscope slide into the solution and then allowing the THF to evaporate from the film.

When the PVC film was illuminated by light of wavelengths below 700 nm., using a Corning glass filter C.S. 4–94, the PVC film emitted infrared radiation of wavelengths above 700 nm.

EXAMPLE 11

When the procedure of Example 10 was followed using cellulose acetate-butyrate instead of poly(vinyl chloride), the polymer film emitted infrared radiation of wavelengths above 700 nm.

EXAMPLE 12

When the procedure of Example 10 was followed using poly(methyl methacrylate) instead of poly(vinyl chloride), the polymer film emitted infrared radiation of wavelengths above 700 nm.

While certain specific embodiments and preferred modes of practice have been set forth, it will be understood that this is solely for the purpose of illustrating the invention to persons skilled in the art, and that various changes and modifications may be made in the invention without departing from the spirit of the disclosure or the scope of the appended claims.

I claim:
1. A chemiluminescent composition intended to be reacted with hydrogen peroxide to obtain infrared emission, said composition comprising an organic bis-ester of oxalic acid and a 16,17-dialkoxyviolanthrone of the formula:

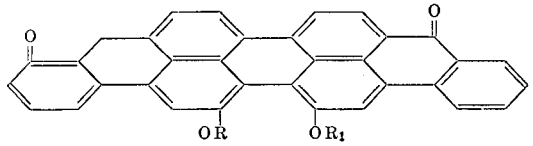

wherein R and R₁ are alkyl groups of 1–18 carbon atoms, as the fluorescer, in a solvent for said oxalate and fluorescer.

2. A composition as in claim 1 wherein said organic oxalate is bis(2,4,6-trichlorophenyl) oxalate.

3. The composition of claim 2 comprising in addition sodium salicylate.

4. The composition of claim 1 wherein said solvent is a liquid organic solvent for said oxalate, 16,17-dialkoxyviolanthrone and hydrogen peroxide.

5. The composition of claim 1 wherein the fluorescer is present in a solid solution.

6. The composition of claim 1 wherein said violanthrone derivative is 16,17-dimethoxyviolanthrone.

7. The composition of claim 1 wherein said violanthrone derivative is 16,17-dihexyloxyviolanthrone.

References Cited

UNITED STATES PATENTS 2,781,362  2/1957  Von.
3,399,137  8/1968  Rauhut et al.

OTHER REFERENCES

DeMent, Fluorochemistry, Chemical Publishing Co. (1946), pp. 163, 222–4, 601–2.

JOHN D. WELSH, Primary Examiner

U.S. Cl. X.R.
252—188.3; 250—42